(No Model.)
J. H. TAYLOR.
CALENDAR.
No. 438,033. Patented Oct. 7, 1890.
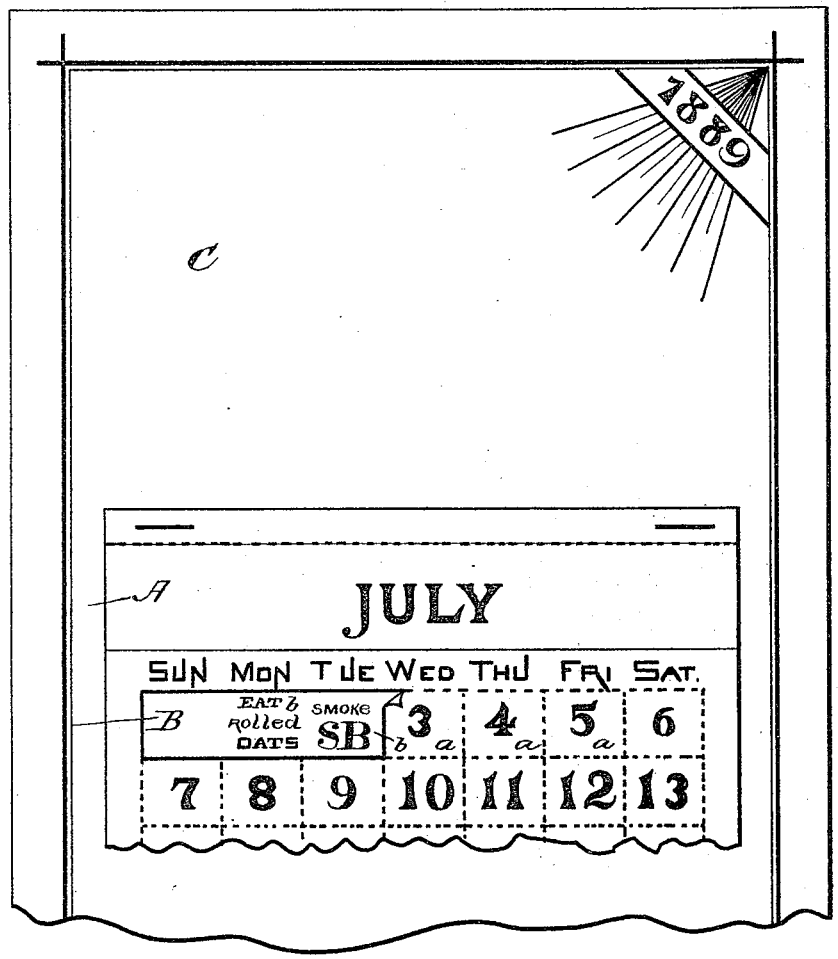
WITNESSES.
Ellen B. Tomlinson.
William B. Roe.
INVENTOR
John H. Taylor
by Alex. P. Browne.
attorney.

UNITED STATES PATENT OFFICE.

JOHN H. TAYLOR, OF CHELSEA, MASSACHUSETTS.

CALENDAR.

SPECIFICATION forming part of Letters Patent No. 438,033, dated October 7, 1890.

Application filed February 24, 1890. Serial No. 341,406. (No model.)

*To all whom it may concern:*

Be it known that I, JOHN H. TAYLOR, of Chelsea, in the county of Suffolk and State of Massachusetts, a citizen of the United States, have invented an Improved Calendar, of which the following is a specification.

My invention relates to calendars for advertising purposes, and its object is to produce an improvement therein whereby they shall possess certain features of novelty, interest, and convenience not heretofore attained.

In the accompanying drawing I have represented my present improvement in the form now best known to me in connection with a common type of calendar, wherein the dates for each month, with the name thereof, are printed upon separate sheets, and those sheets are subsequently stitched or otherwise attached to a suitable backing-piece. I believe it will be obvious, however, from what hereinafter appears that my present improvement is not limited to the specific form of calendar shown.

In the drawing, A represents what I term the "calendar-sheet"—that is to say, the sheet which contains the printed matter ordinarily found in calendars and indicating the day of the week, month, &c. This sheet A is superposed upon a second sheet, (marked B in the drawing,) which I call the "advertising-sheet," and which bears upon it printed matter relating to the business of the person sending out the document as an advertisement.

The sheet A contains detachable date-bearing portions *a*, which are preferably formed by perforations in a well-known manner, and the sheet B contains advertising matter arranged in portions *b*, registering with the date-bearing portions. In this way as each date-bearing portion is removed there is disclosed the corresponding advertisement on the underlying advertising-sheet, which of course may be, if desired, of a different color from the calendar, so as thereby to be more conspicuous. An additional feature of usefulness of the device is that, inasmuch as in its use the dated portions are removed as fast as the corresponding intervals of time elapse, it is easy to perceive at a glance the current date, the eye readily noting the place where the visible advertising matter and the visible dated matter meet, which will of course be the current date desired.

In the drawing I have represented the sheets A and B as blocked in the well-known manner upon a backing-sheet C. It will be understood that when blocked in this form the date-bearing and advertising sheets will be alternated or repeated as frequently as may be necessary to meet the requirements of any particular case.

I claim—

In an advertising-calendar, the combination, with a calendar-sheet having detachable date-bearing portions, of an underlying sheet with advertising matter thereon arranged in separate portions to register with the said date-bearing portions of the calendar-sheet, whereby the removal of each date-bearing portion from the calendar-sheet will bring to view the corresponding advertisement on the advertising-sheet, as described.

In testimony whereof I have hereunto subscribed my name this 31st day of January, A. D. 1890.

JOHN H. TAYLOR.

Witnesses:
 ELLEN B. TOMLINSON,
 GEORGE O. G. COALE.